(12) United States Patent
Goodwin, III et al.

(10) Patent No.: US 7,313,535 B2
(45) Date of Patent: Dec. 25, 2007

(54) SYSTEM AND METHOD OF SCHEDULING ASSISTED-SERVICE TRAVEL TERMINAL REPRESENTATIVES

(75) Inventors: John C. Goodwin, III, Suwanee, GA (US); Michael Edward Halpern, Collingswood, NJ (US)

(73) Assignee: NCR Corporation, Dayton, OH (US)

( * ) Notice: Subject to any disclaimer, the term of this patent is extended or adjusted under 35 U.S.C. 154(b) by 1198 days.

(21) Appl. No.: 10/093,148

(22) Filed: Mar. 7, 2002

(65) Prior Publication Data
US 2003/0171966 A1  Sep. 11, 2003

(51) Int. Cl.
*G06F 9/46* (2006.01)
(52) U.S. Cl. ............................. 705/9; 705/5
(58) Field of Classification Search .......... 705/1, 705/9, 6, 7, 5
See application file for complete search history.

(56) References Cited

U.S. PATENT DOCUMENTS

| | | | | |
|---|---|---|---|---|
| 5,237,499 A * | 8/1993 | Garback | ......................... | 705/5 |
| 5,845,256 A * | 12/1998 | Pescitelli et al. | ............... | 705/4 |
| 6,119,095 A * | 9/2000 | Morita | .......................... | 705/5 |
| 6,295,521 B1 * | 9/2001 | DeMarcken et al. | ........... | 705/6 |
| 6,836,537 B1 * | 12/2004 | Zirngibl et al. | ............. | 379/67.1 |
| 2003/0110062 A1 * | 6/2003 | Mogler et al. | .................. | 705/5 |
| 2003/0130039 A1 * | 7/2003 | Nelson | ........................ | 463/42 |

FOREIGN PATENT DOCUMENTS

WO  WO9617315 A1 *  6/1996

OTHER PUBLICATIONS

Dialog "Lax Airport Travel Tips: Travel tips for the holidays—in three parts", Dec. 1995, News/Travel Editors, Dialog file 810, Acession No. 0543795.*
Jen "No man's land", Jun. 1994, Hotel & Management v214n11 PP: 42, 68+, . Dialog file 15, Accesion No. 0184683, pp. 1-3.*

* cited by examiner

Primary Examiner—Romain Jeanty
(74) Attorney, Agent, or Firm—Paul W. Martin; Maginot, Moore & Beck LLP

(57) ABSTRACT

A system and method of scheduling assisted-service travel terminal representatives which optimizes staffing of assisted-service travel terminals. The system includes a computer for analyzing the first travel information from a plurality of self-service travel terminals and second travel information from a plurality of assisted-service travel terminals to obtain a schedule of operation for the assisted-service travel terminals including optimal numbers of the travel terminal representatives, and for generating a report containing the schedule.

12 Claims, 2 Drawing Sheets

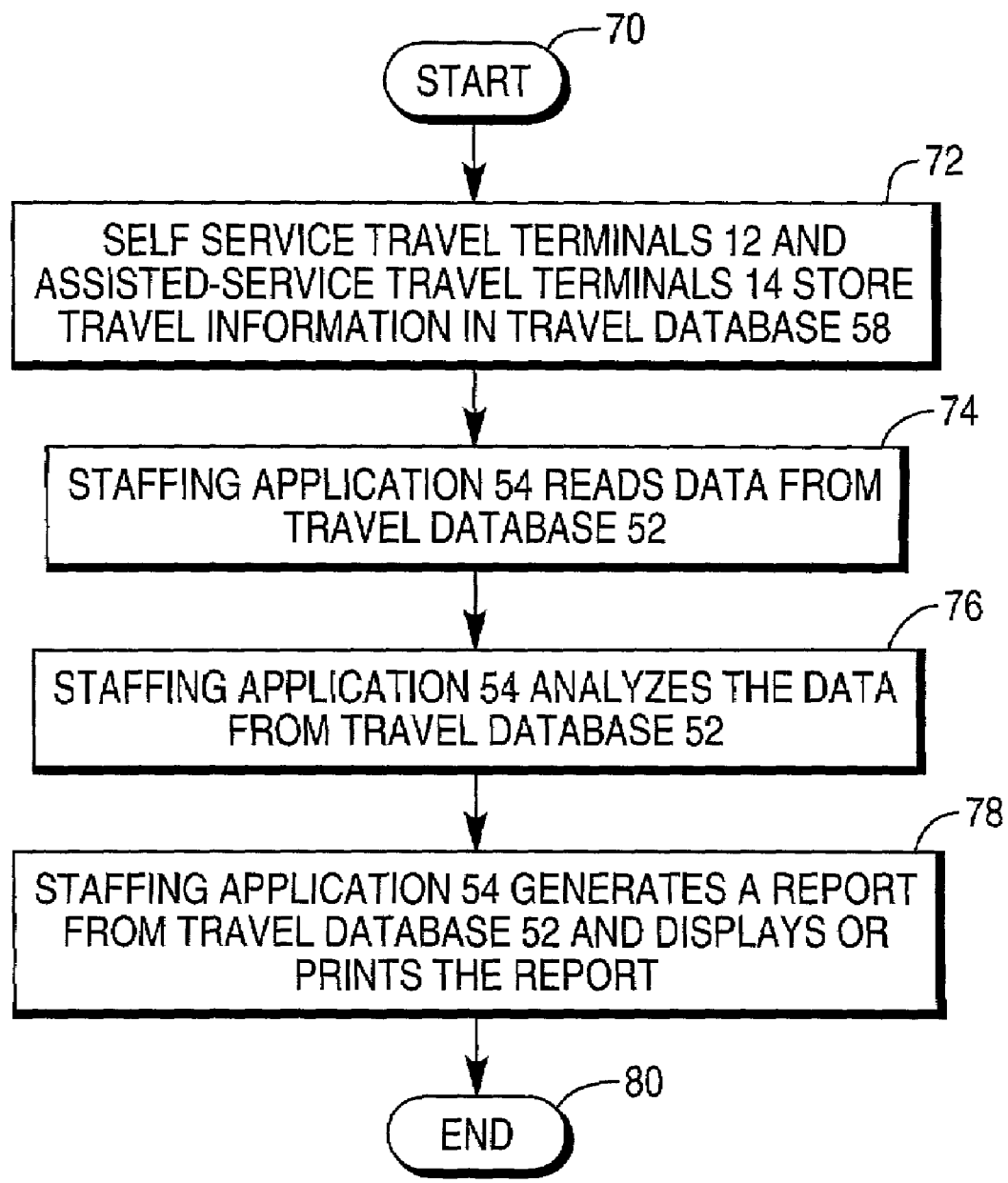

SYSTEM AND METHOD OF SCHEDULING ASSISTED-SERVICE TRAVEL TERMINAL REPRESENTATIVES

BACKGROUND OF THE INVENTION

The present invention relates to self-service kiosks and more specifically to a system and method of scheduling assisted-service travel terminal assisted-service travel terminal representatives.

Kiosks provide a publicly accessible computing platform for displaying World Wide Web (web) pages and other web-delivered content from web sites. Kiosks may be located within a retailer's transaction establishment or elsewhere, such as in shopping malls. Kiosks may be easily networked to web sites using the TCP/IP protocol. Web pages from web sites may be displayed using known and available web software, such as Microsoft® Internet Explorer software.

Transportation companies wish to optimize the number and cost of employees. Some employees work at assisted-service ticket counters and check-in counters. Transportation companies also wish to reduce passenger-waiting time in ticket lines and check-in lines.

Therefore, it would be desirable to provide a system and method of scheduling assisted-service travel terminal representatives that makes more optimal use of transportation company resources.

SUMMARY OF THE INVENTION

In accordance with the teachings of the present invention, a system and method of scheduling assisted-service travel terminal representatives is provided.

The system includes a computer for analyzing the first travel information from a plurality of self-service travel terminals and second travel information from a plurality of assisted-service travel terminals to obtain a schedule of operation for the assisted-service travel terminals including optimal numbers of the travel terminal representatives, and for generating a report containing the schedule.

The method includes the steps of storing first travel information from self-service travel terminals and second travel information from assisted-service travel terminals, reading the first and second travel information, comparing the first and second travel information to obtain a schedule of operation for the assisted-service travel terminals including optimal numbers of the travel terminal representatives, and generating a report containing the schedule.

It is accordingly an object of the present invention to provide a system and method of scheduling assisted-service travel terminal representatives.

It is another object of the present invention to make more optimal use of transportation company resources.

It is another object of the present invention to schedule assisted-service travel terminal representatives based upon factors that cause passengers to use either self-service or assisted-service check-in methods.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a flow diagram illustrating the method of the present invention.

DETAILED DESCRIPTION OF THE PREFERRED EMBODIMENT

Figure 1:
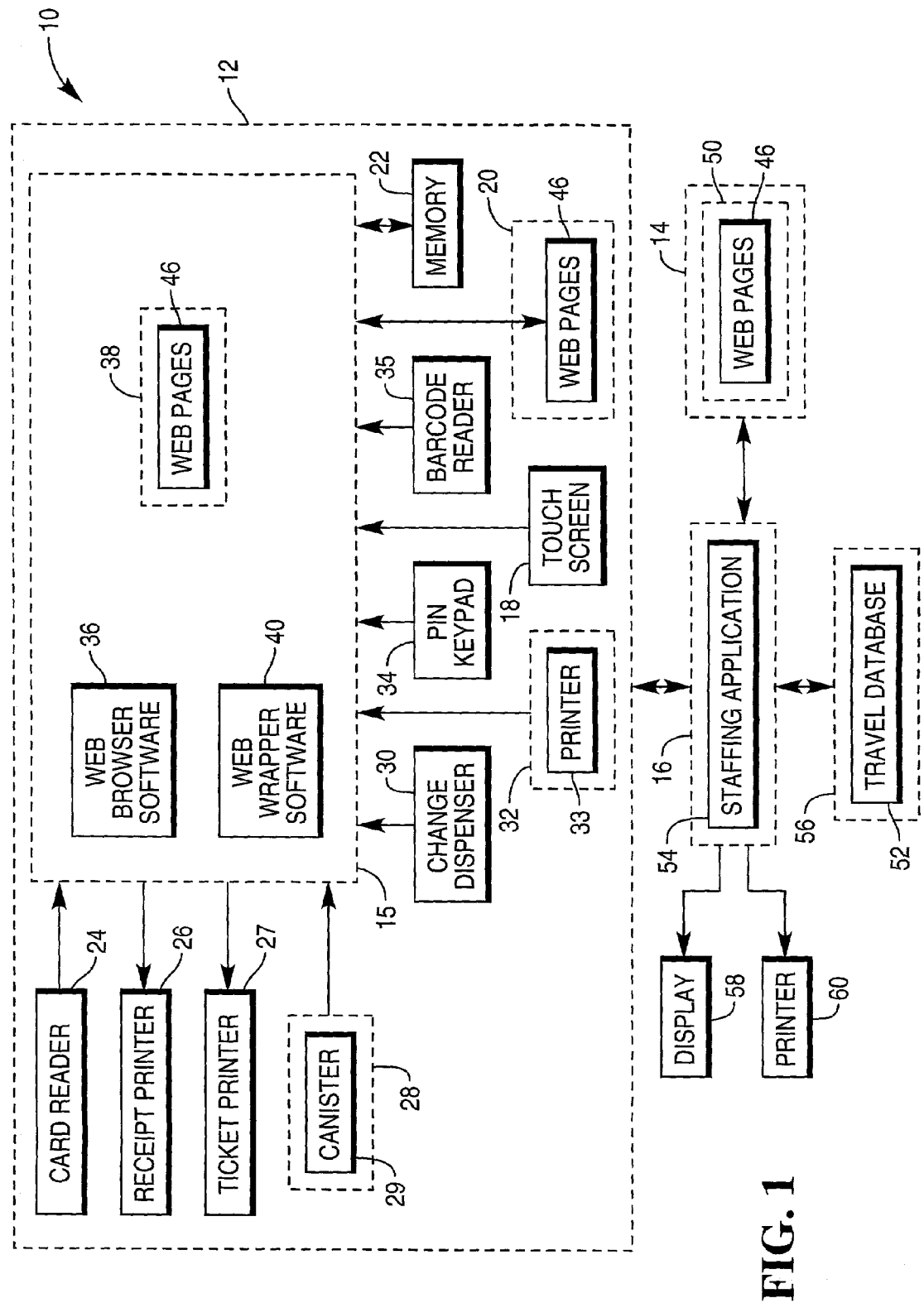
FIG. 1 is a block diagram of a transportation system.

Turning now to FIG. 1, system 10 includes self-service travel kiosk 12, assisted-service travel terminals 14, and server 16.

Kiosk 12 is preferably located in a travel building, such as an airport or train station. Kiosk 12 may include an NCR 7401 computer.

Kiosk 12 primarily includes processor 15, touch screen 18, memory 22, and storage medium 20. Kiosk 12 may be simple and include only receipt printer 26, ticket printer 27, and card reader 24. Kioak 12 may include a number of other peripherals, including printer 26, cash acceptor 28, cash dispenser 30, check reader 32, personal identification number (PIN) keypad 34, and barcode reader 35.

Processor 15 executes self-service travel self-service travel application 38. Self-service travel self-service travel application 38 processes travel-related requests from passengers. For example, a passenger may use self-service travel self-service travel application 38 to complete the check-in process, issue a boarding pass, change travel routes, or get scheduling information. Self-service travel self-service travel application 38 records passenger identification information, retrieves itinerary information from travel database 52 through server 16, displays instructions for completing check-in, records any payments due, dispenses any change due, prints boarding passes and tickets, and prints receipts. In addition, self-service travel self-service travel application 38 records and stores check-in time.

Self-service travel application 38 communicates with server 16 over a network connection, such as one that uses the TCP/IP protocol. Kiosk 12 may be connected to the World Wide Web (web) and may obtain web content from web servers. Server 16 may be a web server.

Processor 15 may also execute web browser software 36 and web wrapper software 40.

Web browser software 36 allows an operator to display information in a format established by the World Wide Web (WWW or "web"). Self-service travel application 38 may be written as a web application which displays travel information in the form of web pages 46, although self-service travel application 38 may also be a non-web application and operate without web browser software 36 and web wrapper software 40. Web pages 46 may be written using hypertext markup language (HTML) or other suitable web page language.

Web browser software 36 may include commercially available web browser software, such as Microsoft® Internet Explorer web browser software. Microsoft® Internet Explorer web browser software is configured into a kiosk operation using a "-k" command line option. This option hides toolbars and menu bars to prevent operator access to those functions.

Web browser software 36 may also display a start or "home" page within web pages 46 which operates as a default page from which kiosk operation begins and to which operation returns when an operator is finished using kiosk 12.

Web wrapper software 40 provides security functions. During operation, web wrapper software 40 prevents an operator from accessing kiosk files, or other applications, or the operating system software, or basic input-output system (BIOS) firmware, and prevents the operator from causing kiosk 12 to reboot.

Touch screen 18 records passenger selections and displays information to self-service passengers.

Storage medium 20 stores web pages 46 for use by self-service travel application 38.

Memory 22 stores executed program information.

Card reader 24 reads passenger identification, credit, debit, SMART, and/or other types of cards carried by a passenger. Card reader 24 may record payment information from a passenger.

Receipt printer 26 prints receipt information.

Ticket printer 27 prints tickets and boarding passes.

Cash acceptor 28 includes currency storage canister 29. Cash acceptor 28 takes in currency, validates the currency, sends tendered amount information to self-service travel application 38, and sends currency count information to self-service travel application 38. Cash acceptor 28 may include a cash acceptor manufactured by CashCode or Mars.

Cash dispenser 30 dispenses any change due.

Check reader 32 reads checks and includes a magnetic ink character (MICR) reader. Check reader 32 also includes printer 33 for printing information on checks.

PIN keypad 34 records PIN numbers for debit card transactions.

Kiosk 12 may additionally include barcode reader 35, which may be used to scan barcode labels on tickets. The barcode labels contain passenger identification information.

Assisted-service travel terminals 14 execute assisted-service travel application software 50, which also processes travel-related requests, except that a travel employee controls assisted-service travel application 50 to process the requests for the passengers. Assisted-service travel application software 50 may be a web application that displays web pages 46 for processing passenger requests. Assisted-service travel terminals 14 also obtain and store travel information in travel database 52. For example, assisted-service travel terminals 14 store check-in times in travel database 52 during passenger check-in.

Other data stored by assisted-service travel terminals 14 might include number of bags, emergency contacts, a comparison between check-in time and flight time, whether kiosk check-in occurred before standard check-in time, and whether a traveler was encouraged to use kiosk 12.

Server 16 executes staffing application 54 which reads travel history data such as check-in time data, departure time data, arrival data, destination location data, and anticipated numbers of passengers from travel database 52 to determine optimal staffing levels at assisted-service travel terminals 14 for any given departure or time of day. Staffing application 54 generates staffing reports containing staffing levels and either prints the reports on printer 60 or displays them on display 58. For example, staffing application 54 may identify passenger loads during any time of day and how many passengers use kiosk 12. Knowing this information, travel management may more accurately determine staffing needs. They may schedule employee resources to improve customer service and reduce waste.

Storage medium 56 stores travel database 52.

Turning now to FIG. 2, operation of system 10 is illustrated in detail beginning with START 70.

In step 72, self service travel terminals 12 and assisted-service travel terminals 14 store travel information in travel database 58.

In step 74, staffing application 54 reads data from travel database 52.

In step 76, staffing application 54 analyzes the data from travel database 52. The analysis may involve a comparison of data from self-service travel terminals 12 and assisted-service travel terminals 14. The analysis results in a schedule of operation for the assisted-service travel terminals including optimal numbers of the travel terminal representatives.

For example, staffing application 54 may compare anticipated passenger loads with current employee schedules to identify times for which too many or too few employees are scheduled to work at assisted-service travel terminals 14.

Staffing application 54 may compare historical usage of self-service travel terminals 12 to historical usage of assisted-service travel terminals 14. This would help determine the number of travelers that would use self service travel terminals 12 for a given time and then a non-usage figure could be used to determine manpower needed.

Staffing application 54 may compare travel time and usage of self service travel terminals 12 to travel time and usage assisted-service travel terminals 14 to determine the affect on usage of self service travel terminals 12.

Staffing application 54 may track whether the traveler has ever been to a particular travel destination and whether the traveler uses self-service travel terminals 12. Staffing application 54 may compare the number of travelers who are at an intermediate stop to the number of travelers originating from the stop, and whether this historical data affects usage of self service travel terminals 12.

In step 78, staffing application 54 generates a report containing the schedule and displays or prints the report. Travel management schedules employees to work at assisted-service terminals 14 based upon the results.

Knowing this information, travel management may more accurately determine staffing needs. They may schedule employee resources to improve customer service and reduce waste. Advantageously, staffing application 54 allows travel employees to speed up passenger check-in and processing of passenger requests.

Operation ends at step 80.

Although the present invention has been described with particular reference to certain preferred embodiments thereof, variations and modifications of the present invention can be effected within the spirit and scope of the following claims.

We claim:

1. A method of scheduling assisted-service travel terminal representatives comprising the steps of:
   (a) storing travel information;
   (b) reading the travel information;
   (c) analyzing the travel information;
   (d) scheduling the assisted-service travel terminal representatives, based at least in part on analyzing the travel information; and
   (e) generating a report containing the schedule, wherein the travel information comprises anticipated passenger loads and current assisted-service travel terminal representative work schedules, and wherein step (c) comprises the substeps of;
   (c-1) identifying times for which at least a predetermined quantity of assisted-service travel terminal representatives are scheduled to work; and
   (c-2) identifying times for which no more than a predetermined quantity of assisted-service travel terminal representatives are scheduled to work.

2. The method as recited in claim 1, wherein the scheduling of the assisted-service travel terminal representatives is optimized to provide for one of improved customer service or reduced waste.

3. A method of scheduling assisted-service travel terminal representatives comprising the steps of:
  (a) storing travel information;
  (b) reading the travel information;
  (c) analyzing the travel information;
  (d) scheduling the assisted-service travel terminal representatives, based at least in part on analyzing the travel information; and
  (e) generating a report containing the schedule, wherein the travel information comprises historical usage of self-service travel terminals and historical usage of assisted-service travel terminals, and wherein step (c) comprises the substeps of;
  (c-1) determining a number of passengers that would use self-service travel terminals during a given time; and
  (c-2) determining assisted-service travel terminal usage from when self-service travel terminals are not used.

4. The method as recited in claim 3, wherein the scheduling of the assisted-service travel terminal representatives is optimized to provide for one of improved customer service or reduced waste.

5. A method of scheduling assisted-service travel terminal representatives comprising the steps of:
  (a) storing travel information;
  (b) reading the travel information;
  (c) analyzing the travel information;
  (d) scheduling the assisted-service travel terminal representatives, based at least in part on analyzing the travel information; and
  (e) generating a report containing the schedule, wherein the travel information comprises travel time and usage of assisted-service travel terminals, and wherein step (c) comprises the substeps of;
  (c-1) comparing the travel time to the usage of assisted-service travel terminals; and
  (c-2) determining travel times at which self-service travel terminals are utilized no more than a predetermined quantity of time by passengers and assisted-service travel terminals are utilized at least a predetermined quantity of time by passengers.

6. The method as recited in claim 5, wherein the scheduling of the assisted-service travel terminal representatives is optimized to provide for one of improved customer service or reduced waste.

7. A method of scheduling assisted-service travel terminal representatives comprising the steps of:
  (a) storing travel information;
  (b) reading the travel information;
  (c) analyzing the travel information;
  (d) scheduling the assisted-service travel terminal representatives, based at least in part on analyzing the travel information; and
  (e) generating a report containing the schedule, wherein the travel information comprises travel destinations and use of self-service travel terminals by passengers going to the destinations, and wherein step (c) comprises the substeps of;
  (c-1) comparing the travel destinations to use of self-service travel terminals by passengers going to the destinations; and
  (c-2) determining destinations for which the self-service travel terminals are utilized no more than a predetermined quantity of time by passengers and assisted-service travel terminals are utilized at least a predetermined quantity of time by passengers.

8. The method as recited in claim 7, wherein the scheduling of the assisted-service travel terminal representatives is optimized to provide for one of improved customer service or reduced waste.

9. A system for scheduling assisted-service travel terminal representatives comprising; a plurality of self-service travel terminals for storing first travel information; a plurality of assisted-service travel terminals for storing second travel information; and a computer operable to (i) analyze the first and second travel information, (ii) schedule the assisted-service travel terminal representatives, based at least in part on analyzing the travel information, and (iii) generating a report containing the schedule, wherein the first travel information comprises anticipated passenger loads, wherein the second travel information comprises current assisted-service travel terminal representative work schedules, and wherein the computer is adapted to analyze and schedule the assisted-service travel terminal representatives based on identifying times for which at least a predetermined quantity of assisted-service travel terminal representatives are scheduled to work; and identifying times for which no more than a predetermined quantity of assisted-service travel terminal representatives are scheduled to work.

10. A system for scheduling assisted-service travel terminal representatives comprising; a plurality of self-service travel terminals for storing first travel information; a plurality of assisted-service travel terminals for storing second travel information; and a computer operable to (i) analyze the first and second travel information. (ii) schedule the assisted-service travel terminal representatives, based at least in part on analyzing the travel information, and (iii) generating a report containing the schedule, wherein the first travel information comprises historical usage of self-service travel terminals, wherein the second travel information comprises historical usage of assisted-service travel terminals, and wherein the computer is adapted to analyze and schedule the assisted-service travel terminal representatives based on determining a number of passengers that would use self-service travel terminals during a given time; and determining assisted-service travel terminal usage from when self-service travel terminals are not used.

11. A system for scheduling assisted-service travel terminal representatives comprising; a plurality of self-service travel terminals for storing first travel information; a plurality of assisted-service travel terminals for storing second travel information; and a computer operable to (i) analyze the first and second travel information, (ii) schedule the assisted-service travel terminal representatives, based at least in part on analyzing the travel information, and (iii) generating a report containing the schedule, wherein the first travel information comprises travel time, wherein the second travel information comprises usage of assisted-service travel terminals, and wherein the computer is adapted to analyze and schedule the assisted-service travel terminal representatives based on comparing the first information to the second information; and determining travel times at which self-service travel terminals are utilized no more than a predetermined quantity by passengers and assisted-service travel terminals are utilized at least a predetermined quantity by passengers.

12. A system for scheduling assisted-service travel terminal representatives comprising; a plurality of self-service travel terminals for storing first travel information; a plurality of assisted-service travel terminals for storing second travel information; and a computer operable to (i) analyze the first and second travel information, (ii) schedule the assisted-service travel terminal representatives, based at least in part on analyzing the travel information, and (iii) generating a report containing the schedule, wherein the first travel information comprises travel destinations and, wherein the second information comprises use of self-service travel terminals by passengers going to the destinations, and wherein the computer is adapted to analyze and schedule the assisted-service travel terminal representatives based on comparing the first information to the second information and determining destinations for which the self-service travel terminals are utilized no more than a predetermined quantity utilized by the passengers and assisted-service travel terminals are utilized at least a predetermined quantity by the passengers.

* * * * *